United States Patent [19]

Scala

[11] Patent Number: 4,729,536
[45] Date of Patent: Mar. 8, 1988

[54] ANAGRAPHIC STAND

[76] Inventor: Harry Scala, 393 Stevens Ave., Ridgewood, N.J. 07450

[21] Appl. No.: 926,531

[22] Filed: Nov. 4, 1986

[51] Int. Cl.⁴ .............................................. B23Q 3/18
[52] U.S. Cl. .................................... 248/429; 248/1 R; 352/87; 74/479; 108/143
[58] Field of Search .............. 248/660, 661, 424, 429, 248/184, 287, DIG. 13; 269/73; 352/87, 50-52; 74/479; 33/1 M, 27.11; 350/530, 531; 108/20, 143

[56] References Cited

U.S. PATENT DOCUMENTS

| | | | |
|---|---|---|---|
| 2,290,585 | 7/1942 | Gentry | 108/143 |
| 3,124,018 | 3/1964 | Gough | 108/20 |
| 3,155,383 | 11/1964 | Whitmore | 108/143 |
| 3,415,600 | 12/1968 | Yarbrough . | |
| 3,495,519 | 2/1970 | Alfsen | 108/20 |
| 3,690,747 | 9/1972 | Vaughn . | |
| 3,801,090 | 4/1974 | Gillen | 248/DIG. 13 |
| 3,807,578 | 4/1974 | Nelson | 269/73 |
| 3,817,609 | 6/1974 | Vaughn . | |
| 3,905,692 | 9/1975 | Hart . | |
| 4,026,536 | 3/1977 | Netto | 269/73 |
| 4,174,887 | 11/1979 | Mesney . | |
| 4,214,823 | 7/1980 | Pritchard . | |
| 4,278,332 | 7/1981 | Eliscu | 352/87 |
| 4,409,860 | 10/1983 | Moriyama | 74/479 |
| 4,434,693 | 3/1984 | Hosoi | 269/73 |
| 4,565,358 | 1/1986 | Hosoi | 269/73 |
| 4,566,325 | 1/1986 | Rante | 269/73 |
| 4,571,087 | 2/1986 | Ranney | 108/143 |
| 4,577,845 | 3/1986 | Kimura | 269/73 |

FOREIGN PATENT DOCUMENTS

| | | | |
|---|---|---|---|
| 185794 | 7/1986 | European Pat. Off. | 352/50 |
| 2229380 | 12/1973 | Fed. Rep. of Germany | 108/143 |
| 2543316 | 9/1984 | France | 352/87 |
| 13155 | 5/1970 | Japan | 248/DIG. 13 |

OTHER PUBLICATIONS

Advertisement for Warren R. Smith, Inc., Optical Systems and Product Designs—Animation Stand Operated by an Analog Control System.

Technical Bulletin No. 9, published May, 1970, by the National Film Board of Canada—Methods of Computer Control of an Animation Stand.

Compumotor Corporation Magazine, pp. 1-17, 20, 33, 48.

*Primary Examiner*—J. Franklin Foss
*Assistant Examiner*—Robert A. Olson
*Attorney, Agent, or Firm*—Jean M. Miller; Timothy J. O'Hearn

[57] ABSTRACT

An anagraphic stand comprises a base frame, a camera support structure and a mobile stage. The stage is driven relative to the camera by octhogonally-mounted linear drive means attached to the base and by a gear-reduced rotary drive means. All of the drive means are electronically converted microstepping devices and the drive structure is specially adapted to provide smooth, vibration-free motion.

20 Claims, 5 Drawing Figures

ANAGRAPHIC STAND

BACKGROUND OF THE INVENTION

1. Field of the Invention

The present invention relates to an animation and graphic system for use in the film and television industries. More particularly, the present invention provides a device for mounting a camera be it photographic or television and an object to be filmed which permits precise, pre-programmed relative motion between the camera and the object.

2. Description of the Prior Art

Animation and graphics in the motion picture or television industry is of two general types, cell animation and graphic animation. Cell animation is the modern day equivalent of the sequential display of hand drawn pictures. Typically, in cell animation, transparent materials are used to prepare overlapping drawings so that the parts of the drawing which contribute to motion can be separated from those which do not. Only those parts of the total picture that exhibit motion need be redrawn or moved from frame to frame of the film; backgrounds are drawn once and retained throughout the sequence. Thus the moving portion is displaced within the background of the cell for each sequential frame of the film.

Graphic animation, on the other hand, does not involve redrawn pictures. The subject matter for graphic animation includes such things as photographic prints, paintings, drawings and maps. Unlike cell animation, where movement exists within the content of the cell background, graphic animation uses entirely self-contained objects of fixed content. Movement is achieved by changing the position of the object relative to the camera photographing or taping it. Thus, in both cell and graphic animation, all movement, with the exception of cell content, is accomplished by the physical manipulation of the object relative to the camera lens.

A typical application for graphic animation, as an example, is filming of a documentary involving artists' paintings. A segment of such a documentary, prepared with a graphic stand, shows the painting in full frame then zooms to move through particular areas of interest and returns to a full frame view. Smooth continuous motion, over a wide speed range and free of annoying vibration and jerky motion, is essential to an aesthetically pleasing film or tape segment.

Prior art animation and graphic systems suffer several shortcomings. In general, they are limited in their motion capabilities and in ease of operation. Prior art animation stands provide only a relatively narrow range of speed capabilities from each of the operational axes. Also, stands which are capable of revolving the photographed or taped object, typically are limited in the number of revolutions and speed range of revolution they can achieve. The most severe limitations of the prior art stands, however, appear in the execution of slow movement along one or more axes. Extremely slow speed motion capabilities are very useful for an animation stand but difficult to obtain without jerky movement or troublesome vibration. This is particularly true when the desired movement requires coordinated motion by several machine axes. Finally, the prior art animation or graphic systems often are difficult to operate because they require complex detailed operator input to instruct the machine to execute particular patterns of movement.

SUMMARY OF THE INVENTION

It is an object of the present invention to provide a highly stable, vibration-free anagraphic stand, capable of a wide range of motion speeds. It is a related object of the present invention to provide an anagraphic stand capable of complex relative motion between the object and the camera, involving the coordination of several axes of movement. It is a futher object to provide the above features in a machine which is easy to operate.

Additional objects, advantages and novel features of the invention will be set forth in part in the description which follows and in part will become apparent to those skilled in the art upon examination of the following, or may be learned by practice of the invention. The objects and advantages of the invention may be realized by means of the devices and methods described in the claims.

In satisfaction of the foregoing objects, the present invention provides an anagraphic stand which consists generally of a base which carries the mobile stage and a camera support, mounted to the base, which holds the camera above the stage. The camera is mounted to permit vertical movement closer to or farther from the stage surface. The stage is mounted on three overlapping drive means which are mounted to the base. Two of the drive means provide linear motion in the horizontal plane along orthogonal axes and the third and uppermost drive means provides rotary motion around the center point of the stage. The stage can rotate within a rotating motion provided by the two horizontal axes, creating dual rotary motion about two points, simultaneously. The base upon which this drive arrangement is mounted provides adjustable, vibration-absorbing feet.

To operate the anagraphic stand of present invention, an operator enters motion data by a computer control or by a computer interactive teach mode. The motion information, when executed by the computer, is received by an indexer which produces drive signals to each of the drive means. The drive means are driven by stop motors which are electronically converted to microstepping motors, thereby providing extremely smooth and precise motion.

The structural configuration and drive arrangement provided by the present invention permit very broad range of speeds, including motion so slow that it is imperceptible to the human eye. In addition, the present invention provides extremely smooth motion throughout its speed range by the use of digitally controlled stepper motors for rotary motion and stepper forces for linear motion. At the same time, the present invention eliminates unwanted vibration present in the operating environment and potentially created by the drive means. Additional advantages of the invention will be described below and may become apparent to those skilled in the art upon reading the description or upon practicing the invention.

DETAILED DESCRIPTION OF THE PREFERRED EMBODIMENT

Figure 1:
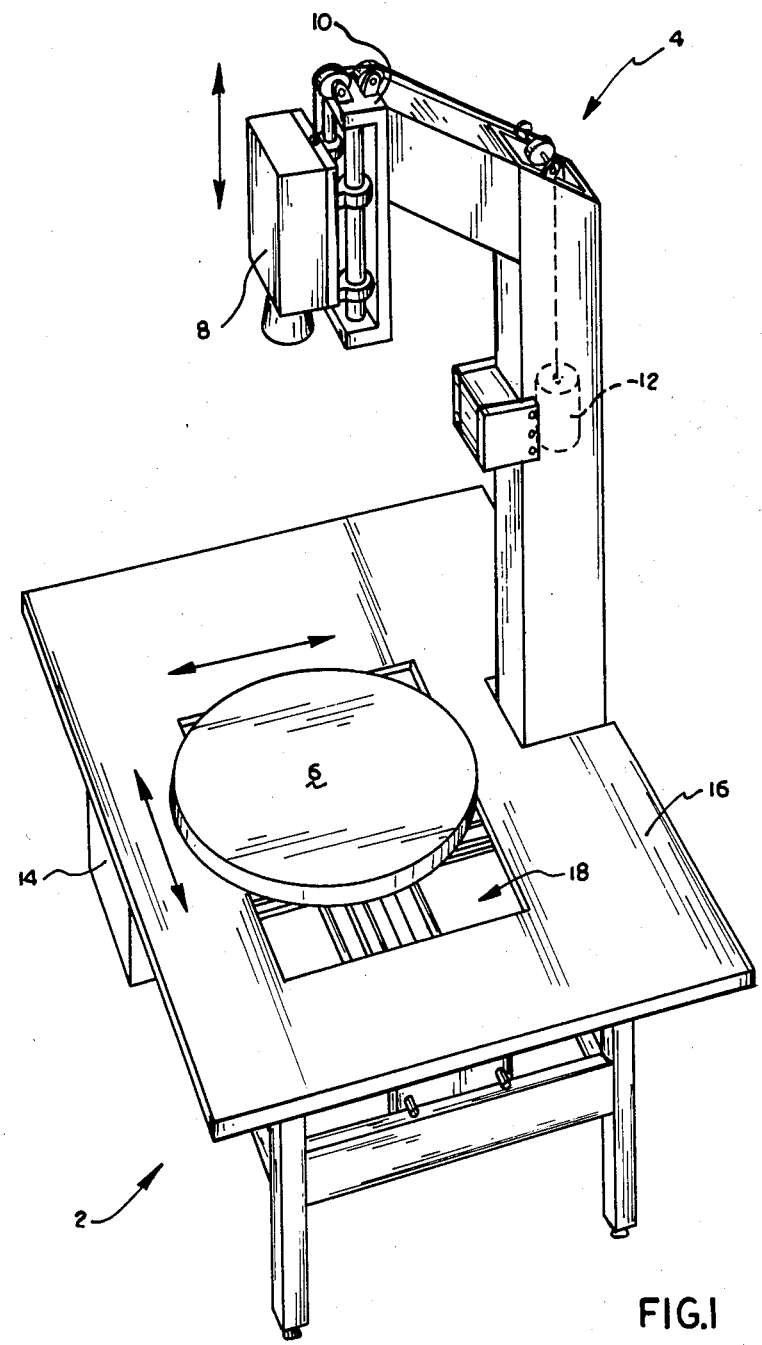
FIG. 1 is a perspective view of the anagraphic stand of the present invention.

FIG. 1 provides a perspective view of the present invention. There is shown generally in FIG. 1 a base 2 and a camera column 4. The base 2 consists of a support frame housing certain drive components which provide motion to the stage of light box 6. In the preferred embodiment, stage of light box 6 is capable of providing variable light intensity. The camera column 4 is rigidly attached to the support frame of base 2 to hold the camera 8 directly above the center of light box 6 when light box 6 is in the home position. In the preferred embodiment, the camera 8 is mounted on a camera slide assembly 10, described in greater detail below, which permits the camera to be moved in a vertical "Z" axis. This movement is facilitated by a camera slide counterweight 12 housed within the camera column 4. The operation of the graphic stand is conducted via the computer of programmable controller 14, retractably housed in a recess in the front of base 2. Base 2 is provided with a top 16 which encloses the entire upper surface area of base 2 with the exception of the region 18 provided to accommodate the motion of the drive mechanisms and light box 6.

Figure 2:
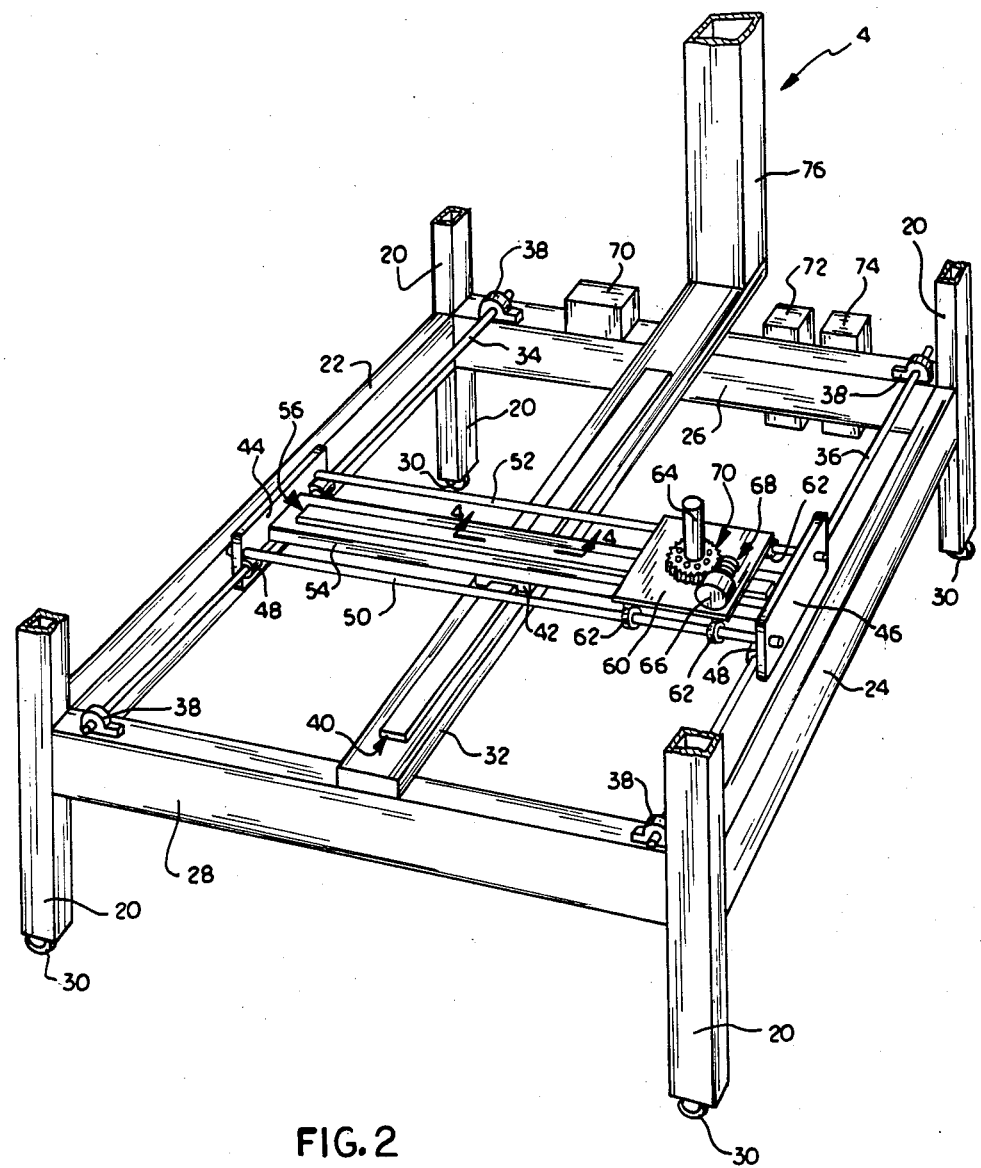
FIG. 2 is a perspective view of the base of the anagraphic stand with parts removed to expose the drive mechanism.

In FIG. 2 there is shown a perspective view of the base 2 with the top 16, light box 6 and computer 14 removed to provide a clear view of the internal drive mechanism and support structure. To the rear of the structure illustrated in FIG. 2 there is visible the bottom portion of camera column 4. The base frame or rigid support frame consists of four legs 20 joined together by side frame members 22 and 24, rear frame member 26 and front frame member 28. Each of the legs 20 has an adjustable foot 30 which provides for leveling the device and includes a rubber vibration absorbing member positioned between foot 30 and leg 20 on each of the four corners. This rubber absorption member eliminates transfer of floor vibration to the device.

Transverse beam 32 is rigidly mounted to span from front support member 28 to rear support member 26 midway between side support members 22 and 24. Camera column 4 is rigidly fixed to the extending portion of beam 32 adjacent rear support member 26.

Two parallel hardened rods 34 and 36 are mounted on rear support member 26 and front support member 28 adjacent legs 20 by fasteners 38. A drive mechanism consisting of a combination platen 40 and forcer 42 is rigidly attached to beam 32. The platen/forcer drive assembly is a conventional commercially available driver. The platen and forcer provide linear motion; when the proper electrical pulses are supplied to forcer 42, it moves across the platen 40 at a controlled rate in minute, discrete stepped increments.

Rods 34 and 36 provide support and guidance for a drive assembly which spans their length and is driven by forcer 42. End plates 44 and 46 are slidably mounted to rods 34 and 36, respectively, by four ball bushings 48 (one of which is hidden from view). The ball bushings 48 are rigidly mounted to their respective end plates 44 and 46. Also mounted to end plates 44 and 46 are lateral rods 50 and 52 and lateral beam 54. As seen by the illustration, this assembly of parts spans the distance between rods 34 and 36 and is slidable along a path parallel to rods 34 and 36 by virtue of the ball bushings 48. Motion of this assembly along rods 34 and 36 is provided by forcer 42 which is attached indirectly to beam 54. This combination of features, therefore, provides front to back or "X"-axis motion.

In a similar manner, motion is provided from side to side, or along the "Y"-axis, by means of a second platen 56 and associated forcer 58 (concealed from view by platform 60). Platen 56 is rigidly mounted to the transverse beam 54. The forcer associated with platen 56 is attached to the underside of platform 60. Platform 60 spans transverse rods 50 and 52 and is mounted to those rods by ball bushings 62. The ball bushings 62 permit platform 60 to be moved along rods 50 and 52. This motion is accomplished by the step-wise movement of forcer 58 relative to its associated platen 56, which occurs when proper electrical signals are applied. This assembly, therefore, adds a lateral or Y-axis motion to the platform 60.

Mounted atop platform 60 there is provided a rotatable spindle 64 which, in the assembled machine, supports light box 6 shown in FIG. 1. Rotatable spindle 64 is driven in rotary motion by any suitable drive means. In the preferred embodiment, there is provided a step motor 66 which drives a worm gear 68. This, in turn, drives a worm wheel 70 which is rigidly attached to spindle 64. The worm gear/worm wheel assembly is provided as a speed reduction means to accommodate the extremely slow movement often desired of graphic stands and to overcome inertia of the drive assembly.

As part of the entire drive system, there are provided controllers 70, 72 and 74 which supply the appropriate electrical signals to forcer 42, forcer 58 (hidden from view), and step motor 66. The controllers 70, 72 and 74 receive control signals from an operator-programmed computer 14 and generate appropriate electrical signals which are transmitted to the appropriate motor or linear drive via conventional sliding electrical contact hardware or flexible wiring (not shown).

As previously mentioned, the present invention is operated by a computer or programmable controller 14 which provides the highest level of motion commands. Such conventional programmable controllers or computers may be programmed to accomplish specific motion tasks either by directly programming the motion data or by entering the data through a teach mode. During the teach mode of a typical control system the operator actuates the X or Y drive forcers to move the light box 6 to desired positions along a desired pat. By so doing, the operator established numerous goal points on a path of movement which the computer later will follow. In operation, the computer 14 provides high level command signals to the intermediate controller or indexer which interprets these commands and generates the necessary pulse stream to control the velocity, acceleration, and direction of the drives. When properly programmed, the computer can simultaneously control the generation of both the X-axis and Y-axis drives and the rotary motor plus miscellaneous peripherals. In the preferred embodiment, the computer is pre-programmed to provide a home position in which the center of light box 6 coincides with the visual center line of camera 8. The computer is pre-programmed to always return to that position when the machine is first activated and at the beginning and end of each motion sequence. This feature is advantageous for the use of attachments such as axial view attachments to the light box 6.

As previously mentioned, the preferred embodiment of the present invention provides that the step motor 66 and forcers 42 and 58 be positioned with increased accuracy by computer 14 and controllers 70, 72 and 74 through the use of digital signals and bipolar pulse-witdh modulation to operate the motor and forcer as "microstepping" motor and forces. This is done with a conventional step motor by proportioning the current levels between the phases of the step motor which, in conventional operation, are either entirely on or off. By proportioning the current in this manner, a standard 200 step per revolution hybrid step motor is electronically converted into a 25,000 step per revolution into microstepping devices. This feature of the present invention permits the light box 6 to be rotated through the worm gear reduction so slowly that it is imperceptible to the human eye. Yet, because the motion intervals are so small, the motion provided by the present invention is smooth and vibration-free. Examples of microstepping motors and drives of the type used in present invention are those commercially available from Compumotor Corporation of Petaluma, Calif. Examples of programmable controllers and interface means suitable for the present invention also can be found among the items manufactured and sold by Compumotor Corporation.

Figure 3:
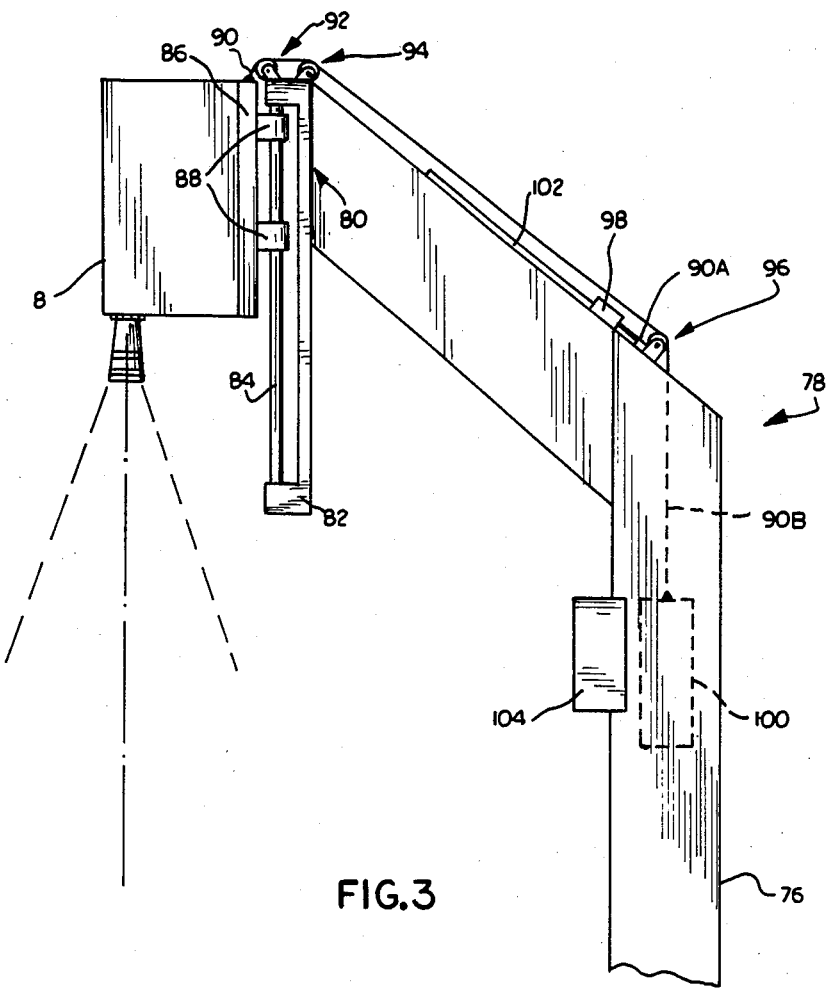
FIG. 3 is a side elevation view of the camera column portion of the present invention.

Turning now to FIG. 3, the camera column 4 and associated assembly are illustrated in greater detail. As seen in that figure and FIG. 2, vertical column 76 is attached at its lower end to beam 32. At its upper extremity, vertical column 76 is bent as shown at 78 towards the front of the device, or support member 28, to terminate in a vertical face 80. Rigidly attached to vertical face 80 is a C-plate 82. Spanning the forward-facing ends of C-plate 82 are two hardened rods 84, only one of which is visible in the side view of FIG. 3. Rods 84 are rigidly attached to C-plate 82 and both are parallel to the vertical axis. Camera mounting plate 86 is slidably attached to rods 84 by four ball bushings 88, only two of which are visible in the side view provided by FIG. 3. To the upper edge of camera plate 86 there is attached a cable 90. Cable 90 is supported along the exterior of the camera column 4 by pulleys 92, 94 and 96. At an appropriate location between pulleys 94 and 96 cable 90 is split so that one-half, shown as 90-A, can be wrapped around pulley 96 and attached to forcer 98 and the other half, 90-B, may pass over pulley 96 and be attached to counterweight 100, suspended within column 96 and shown in phantom lines. Forcer 98 operates together with platen 102 which is rigidly attached to the exterior of column 76. Counterweight 100 weighs slightly less than the combination of camera 8, camera mount plate 86 and ball bushings 88. In this manner, relatively little force is required by forcer 98 operating along platen 102 to raise camera 8. Accordingly, extremely smooth and easily controlled motion is provided by the forcer 98. The electrical signals for forcer 98 required to execute such movement are provided by controller 104 which may receive its instructions from computer 14 shown in FIG. 1.

Figure 4:
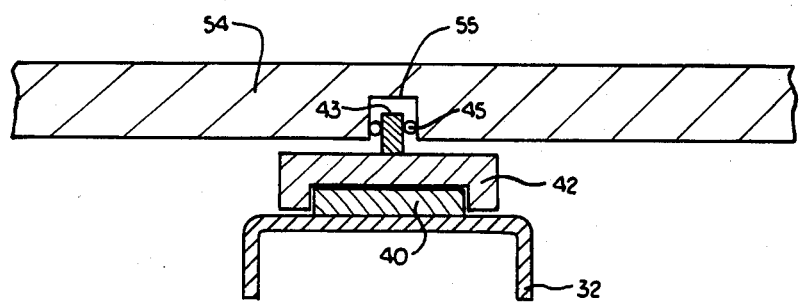
FIG. 4 is a partial cross-sectional view taken along line 4—4 of FIG. 2.

As previously stated, the present invention provides smooth, vibration-free operation. These characteristics are provided both through the design described above and are further ensured by two additional details designed to prevent the drive assembly from binding or slipping. The first of these details is illustrated in FIG. 4, which is a sectional view taken along the line 4—4 of FIG. 2. In FIG. 4 there is shown the support beam 32 and the attached platen 40. Forcer 42 surrounds the upper portion of platen 40, maintaining a slight clearance between the topside of platen 40 and the underside of forcer 42. Experience has shown that if the forcer 42 is forced out of alignment with platen 40 or is pressed downward toward platen 40 so as to reduce the clearance, the operation of forcer 42 will become erratic. To avoid this possibility and the resulting jerky or uneven motion, power transmission is accomplished through a now-binding, vibration resistant gimbal arrangement. The underside of the driven member, in this case beam 54, is provided with an annular recess 55. To the top of forcer 42 there is attached a post 43. The annular recess 55 is designed to accommodate both the post 43 and a rubber O-ring 45. These features permit movement of forcer 42 to be translated to beam 54 without risking the possibility that the weight of beam 54 and its associated assembly or the lack of parallelism of rods 34 and 36 might distort the clearances between forcer 42 and platen 40, thus resulting in rough or jerky motion. A similar mounting arrangement is provided at the point where forcer 58 drives platform 60 as illustrated in FIG. 2.

Binding and vibration problems in the power transmission linkage are also alleviated by special treatment of the ball bushings used to provide smooth motion along the hardened shafts shown in FIG. 2. As stated above in connection with FIG. 2, the ball bushings 48 and 62 permit the drive assembly to move alongs rod 34, 36, 50 and 52. If misalignment arises among the various parts and rods, however, the same binding, slipping, and potential vibrations arise as those mentioned above. In particular, if misalignment occurs between the central axis of any one ball bushing and the central axis of the rod on which it slides, the balls will tend to bind and cause a rough motion.

Figure 5:
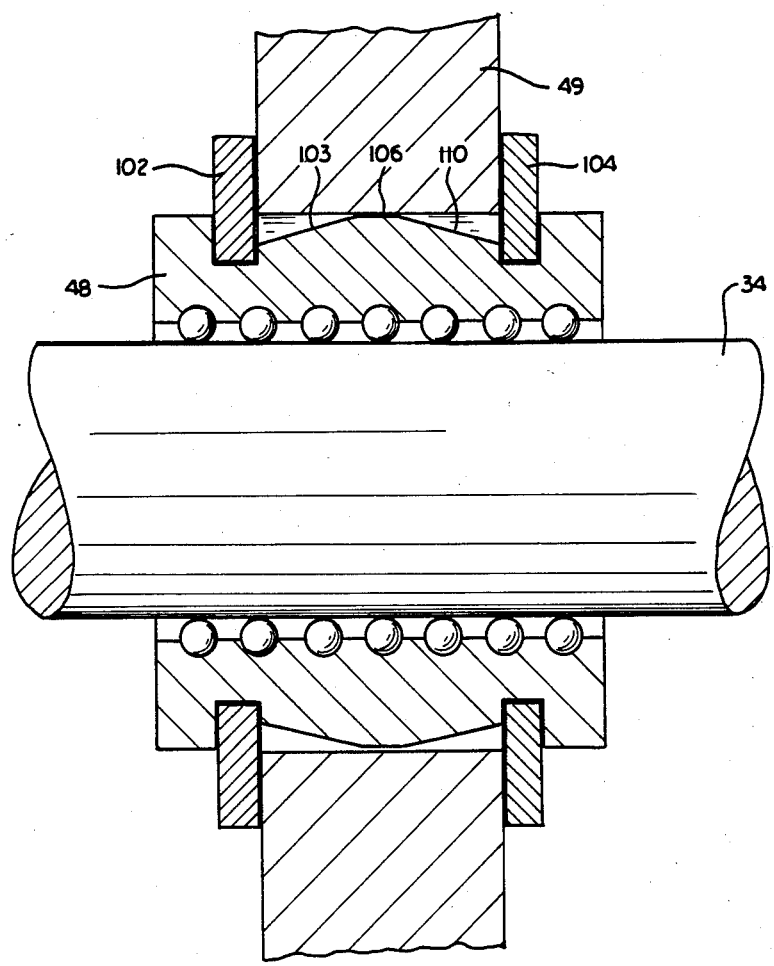
FIG. 5 is a cross-sectional view of a rod and ball bushing of the present invention showing, by an exaggerated view, the modifications to the ball bushing.

This potential is overcome in the present invention by a special treatment of the ball bushings. FIG. 5 provides an exaggerated cross sectional view through rod 34, ball bushings 48 and housing 49 with the treatment of the ball bushings exaggerated slightly. To prevent binding of the ball bushing 48 on rod 34, the outside diameter of the bushing between snap rings 102 and 104 is machined to provide the illustrated surface characteristics. A central landing 106 equivalent to the original outside diameter is left intact and sloped surfaces 108 and 110 are machined on the outside diameter of the ball bushing away from landing 106 toward snap rings 102 and 104. This arrangement permits the ball bushing 48 to maintain parallelism with rod 34 without binding in the inside diameter of housing 49.

The foregoing description of a preferred embodiment and alternative embodiments of the invention have been presented for purposes of illustration and description. The description is not intended to be exhaustive or to limit the invention to the precise form disclosed. Obviously, many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

What is claimed is:

1. A graphic stand animation system comprising:
a rigid support frame;

a camera tower attached to said support frame so as to hold a camera above said support frame and positioned along a vertical line of sight;

a first drive support beam rigidly attached to said rigid support frame;

a first linear drive means mounted to said first drive support beam;

a first set of at least two horizontal support means attached to said rigid support frame and adapted to provide substantially coextensive support tracks;

a second drive support beam slidably mounted to said first set of support means and drivable by said first linear drive means, said second drive support beam being mounted transversely to said drive means;

a second linear drive means mounted to said second drive support beam;

means for attaching a stage to said second linear drive means;

and means for producing appropriate electrical drive signals to said first and second linear drive means in accordance with operator instructions.

2. A graphic stand animation system according to claim 1 wherein said stage attaching means comprises:

a second set of at least two horizontal support means slidably mounted to said first set of support means and drivable along said first set of support means by said first linear drive means;

a platform slidably mounted to said second set of support means; and means for attaching said stage to said platform.

3. A graphic stand animation system according to claim 2 wherein said means for attaching said stage to said platform comprises:

a vertical spindle rotatably mounted to said platform; and rotary drive means for rotating said spindle.

4. A graphic stand animation system according to claim 1 wherein said first and second linear drive means comprise microstepping plates and forcer assemblies.

5. A graphic stand animation system according to claim 3 wherein said rotary drive means comprises a microstepping step motor and a gear reduction means.

6. A graphic stand animation system according to claim 2 wherein said first and second linear drive means comprise microstepping plates and forcer assemblies.

7. A graphic stand animation system according to claim 3 wherein said first and second linear drive means comprise microstepping plates and forcer assemblies.

8. A graphic stand animation system according to claim 4 wherein said rotary drive means comprises a microstepping step motor and a gear reduction means.

9. A graphic stand animation system according to claim 7 wherein said rotary drive means comprises a microstepping step motor and a gear reduction means.

10. A graphic stand animation system according to claim 2 wherein said first and second sets of support means comprise metal rods and said platform is slidably mounted by ball bushings adapted to be self-aligning with said metal rods.

11. A graphic stand animation system according to claim 2 wherein said support frame is supported on its mounting surface by a means for absorbing ambient vibrations.

12. A graphic stand animation system according to claim 10 wherein said support frame is supported on its mounting surface by a means for absorbing ambient vibrations.

13. A graphic stand animation system according to claim 3 wherein said first and second sets of support means comprise metal rods and said platform is slidably mounted by ball bushings adapted to be self-aligning with said metal rods.

14. A graphic stand animation system according to claim 13 wherein said support frame is supported on its mounting surface by a means for absorbing ambient vibrations.

15. A graphic stand animation system according to claim 7 wherein said first and second sets of support means comprise metal rods and said platform is slidably mounted by ball bushings adapted to be self-aligning with said metal rods.

16. A graphic stand animation system according to claim 15 wherein said support frame is supported on its mounting surface by a means for absorbing ambient vibrations.

17. A graphic stand animation system according to claim 8 wherein said first and second sets of support means comprise metal rods and said platform is slidably mounted by ball bushings adapted to be self-aligning with said metal rods.

18. A graphic stand animation system according to claim 17 wherein said support frame is supported on its mounting surface by a means for absorbing ambient vibrations.

19. A graphic stand animation system according to claim 9 wherein said first and second sets of support means comprise metal rods and said platform is slidably mounted by ball bushings adapted to be self-aligning with said metal rods.

20. A graphic stand animation system according to claim 19 wherein said support frame is supported on its mounting surface by a means for absorbing ambient vibrations.

* * * * *